United States Patent [19]

Bakker et al.

[11] Patent Number: 4,900,578

[45] Date of Patent: Feb. 13, 1990

[54] PROCESS FOR MAKING FROZEN REHYDRATED LEGUMES

[75] Inventors: James L. Bakker, Strongsville, Ohio; Mark A. Uebersax, Perry, Mich.; Anthony P. Kowal, Brunswick, Ohio; Richard K. McGinnis, Cleveland, Ohio; David Williams, Berea, Ohio

[73] Assignee: Great Lakes Frozen Foods, Inc., North Royalton, Ohio

[21] Appl. No.: 176,050

[22] Filed: Mar. 30, 1988

[51] Int. Cl.$^4$ .................................................. A23L 1/36
[52] U.S. Cl. ...................................... 426/634; 426/508; 426/524
[58] Field of Search ............... 426/634, 506, 507, 508, 426/509, 524, 271

[56] References Cited

U.S. PATENT DOCUMENTS

| | | | |
|---|---|---|---|
| 2,232,282 | 2/1941 | Struble | 426/634 |
| 2,400,123 | 5/1946 | Levinson et al. | 426/634 |
| 3,318,708 | 5/1967 | Rockland | 426/634 |
| 3,415,664 | 12/1968 | Montgomery | 426/509 |
| 3,635,728 | 1/1972 | Rockland | 426/634 |
| 3,869,556 | 3/1975 | Rockland | 426/509 |
| 3,881,033 | 4/1975 | Steele | 426/460 |

OTHER PUBLICATIONS

Tressler, 1968, The Freezing Preservation of Foods (vol. 4), pp. 121–124 and 231–240, AVI Publishing Co., Inc., Westport Conn.

Simpson, 1962, The Frozen Food Cookbook, pp. 98–108, 161–164.

*Primary Examiner*—Carolyn Paden
*Attorney, Agent, or Firm*—Pearne, Gordon, McCoy & Granger

[57] ABSTRACT

A process for preparation of frozen table-ready legumes from dried legumes is disclosed. The process of preparing legumes comprises the steps of: soaking dried legumes in water for approximately 16–18 hours at atmospheric pressure and an ambient temperature of about 45°–80° Fahrenheit; cooking the legumes for about 1¼ to 1¾ hours without boiling in water maintained at atmospheric pressure and about 195°–210° Fahrenheit to achieve a moisture content of at least about 68 percent; and freezing the rehydrated legumes.

4 Claims, No Drawings

PROCESS FOR MAKING FROZEN REHYDRATED LEGUMES

BACKGROUND OF THE INVENTION

This invention relates to a process for producing a frozen table-ready rehydrated legume and to frozen prepackaged mixes for dishes such as chili that use beans prepared by the process.

The seeds of legumes are often allowed to dry naturally in the field before they are harvested. These include varieties such as small red beans, dark red kidney beans, chick peas and pinto beans.

To prepare such legume seeds or beans for consumption, it is necessary to restore moisture to the beans to make them soft and tender, as well as to cook them to remove unpleasant raw tastes.

As the skin of the beans is difficult to pass water through, it takes substantial time or effort to rehydrate the beans. A long soaking time, pressure-cooking, or soaking at varying pressures has been used to rehydrate beans.

Soaking the beans for periods greater than 18 hours is undesirable, as temperature control or additives to the soak water may be necessary to inhibit bacterial growth and enzyme action. Not only may unhealthy bacteria grow, but also, deleterious effects on the beans' taste and appearance often occur as a result of the action of the bacteria and the soaking out of enzymes in the beans.

It is advantageous to a restaurant or homemaker to avoid all of the inefficiency, time and trouble of rehydrating and cooking the beans. This is one of the main reasons for the popularity of conventionally canned legumes.

SUMMARY OF THE INVENTION

The present invention includes a new process for preparing dried beans, or other dried legumes, such that a frozen product suitable for defrosting and immediate eating or inclusion in other food products is produced.

The process produces beans ready for immediate use by a restaurant or homemaker. No additional cooking is necessary. The beans produced are essentially interchangeable with canned beans for any purpose.

The process requires minimal equipment and very little energy. Optimum advantage is taken of unheated soaking and minimum heat cooking steps.

The beans prepared by this method have been found to produce less flatulence and to be easier to digest, particularly for the elderly.

The minimal agitation and the lack of boiling in the process results in beans with very little splitting or damaged skins. This results in beans of very pleasant appearance. The rehydrated beans have been found to have a water content approaching 70 percent by weight, as opposed to 50 percent by other methods. This makes for a much tenderer, yet still well-formed, bean.

In addition, a convenient frozen premixed product comprising the beans produced by the process mixed with other ingredients is disclosed.

The frozen premixed product may be advantageously packaged in either single, family or institutional servings or batches. Dishes such as chili may then be prepared for heating by the purchaser of the mixture by just adding, for example, water and cooked meat.

The frozen prepackaged mixes may be advantageously used in both the home and in restaurants. Not only are they time savers, but also they require little or no skill on the part of the preparer.

DESCRIPTION OF THE PREFERRED EMBODIMENT

The process for rehydrating the beans comprises a soaking step, a cooking step and a freezing step.

In the soaking step, the dried beans are placed in a tank of water at ambient temperature and atmospheric pressure. The temperature may be between about 45° and about 80° Fahrenheit. The beans are allowed to soak without agitation for approximately 16–18 hours. Longer soaking may lead to excessive bacterial growth and enzymatic breakdown of the bean fiber. If longer soaking is used, it may be necessary to control the temperature to limit the effect of bacterial and enzymatic action.

In the cooking step which follows the soaking step, the soaked beans are cooked for the approximate period of 1½ hours, plus or minus ¼ hours, without boiling, in water maintained at atmospheric pressure and a temperature of approximately 195° to 210° Fahrenheit. The lack of boiling minimizes the agitation of the beans during cooking. This prevents most splitting and sloughing of the skin.

In the freezing step which follows the cooking step, the cooked beans are rapidly frozen to preserve their freshness until they are ready to be used. The beans may be either individually quick frozen, thereby allowing selection of any quantity of frozen beans to be dispensed, or they may be frozen in a block-like form for use in premeasured quantities.

The beans produced by the process are tender and ready to eat. They may be substituted for any application that would employ canned beans. The beans are hydrated preferably to a level of at least about 68 percent and preferably about 70 percent water content by weight. The resulting beans have been found to produce less flatulence than canned beans and to be easier to digest.

It is advantageous to divide the cooking step into two steps in order to save energy and further improve bean appearance. First, the soaked beans are cooked for approximately 9½ minutes, without boiling, in water maintained at atmospheric pressure and approximately 205° to 210° Fahrenheit.

The partially cooked beans are then added to a covered and thermally insulated tank of water at approximately 210° Fahrenheit at atmospheric pressure and further cooked for approximately 1½ hours without addition of heat. The insulated tank is insulated such that the temperature of the contents preferably does not drop below 200° Fahrenheit. The cooking in the insulated tank ensures a good appearance of the final beans because convection currents in the tank are reduced to a minimum, resulting in less agitation and physical damage to the beans.

To help maintain the color of the beans, ascorbic acid or a salt of ethylenediamine tetraacetic acid may be added to the water in the process. These chemicals help prevent oxidation of the pigments in the skins of the beans.

The rehydrated beans produced by the disclosed process may be advantageously used commercially to prepare a frozen product or kit for use in the home and in restaurants. A chili mix kit, for example, may be produced that requires the preparer to only add water and cooked meat to produce chili without any cooking skills.

The frozen chili kit comprises conventional seasonings, 15 ounces of tomato sauce (or equivalent amounts of tomato puree or paste), 8 ounces of diced onions, 3 ounces of diced peppers, 5½ ounces of dark red kidney beans prepared according to the disclosed method and 9 ounces of small red beans also prepared according to the disclosed method. The vegetables may be frozen before or after being assembled in their respective proportions and may be pre-mixed or separately grouped in a packaged kit. To the contents of this packaged kit, the preparer adds 12 ounces of cooked hamburger meat and a pint of water to produce 69½ ounces of chili (4-6 servings). The quantities are of course relatively approximate and may be scaled up or down as desired.

The product kit may be packaged in either institutional or home quantities. The institutional or restaurant quantity is typically 15 to 25 pounds, while the home premix quantity is typically 1 to 3 pounds.

The frozen kit may be packaged in heat-sealed polyethylene plastic bags or in sealed cardboard boxes. The frozen kit may also be packaged in a pail such as used by the margarine industry. Such a pail typically comprises a polyethylene plastic container with a snap-fit lid. Besides a chili mix kit, rehydrated beans, processed by the disclosed method of the invention, can be used in place of conventionally canned beans for making salads and, in particular, for making three bean salad.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A process for preparing legumes, comprising the steps of:
    (a) firstly, soaking dried legumes in water for about 16-18 hours at atmospheric pressure and an ambient temperature of about 45°-80° Fahrenheit;
    (b) secondly, cooking the legumes for about 1¼ to 1¾ hours in water at atmospheric pressure and about 195°-210° Fahrenheit, but below its boiling point, to achieve a moisture content of about at least 68 percent by weight; and
    (c) thirdly, freezing the legumes, whereby tender, rehydrated, completely cooked legumes of well-formed appearance are economically provided.

2. A process according to claim 1, wherein said legumes are provided as small red beans.

3. A process according to claim 1, wherein said legumes are provided as dark red kidney beans.

4. A process according to claim 1, wherein said cooking step further comprises the steps of:
    (a) cooking the legumes for about 9½ minutes, without boiling, in water at atmospheric pressure and maintained at about 205°-210° Fahrenheit; and
    (b) subsequently cooking the legumes for about 1½ hours without further addition of heat by immersion in a tank of water at atmospheric pressure and initially about 210° Fahrenheit, the tank being sufficiently insulated to maintain the water temperature above about 200° Fahrenheit for about 1½ hours.

* * * * *